A. Goetzinger,
Bung Cutter.

No. 92,439. Patented July 13, 1869.

Attest:
Jas H Layman
W B During

Inventor:
A. Goetzinger
By Hughes
atty

United States Patent Office.

ANDREW GOETZINGER, OF CINCINNATI, OHIO.

Letters Patent No. 92,439, dated July 13, 1869.

IMPROVEMENT IN BUNG-CUTTER.

The Schedule referred to in these Letters Patent and making part of the same.

*To whom it may concern:*

Be it known that I, ANDREW GOETZINGER, of Cincinnati, Hamilton county, Ohio, have invented a new and useful Bung-Cutter; and I hereby declare the following to be a full, clear, and exact description thereof, reference being had to the accompanying drawings, making part of this specification.

This invention relates to the application of a pair of converging cutters, sliding in a fixed head, which are brought to bear upon a rotating blank, in such a manner as to form a bung therefrom.

In the drawings—

Figure 1:
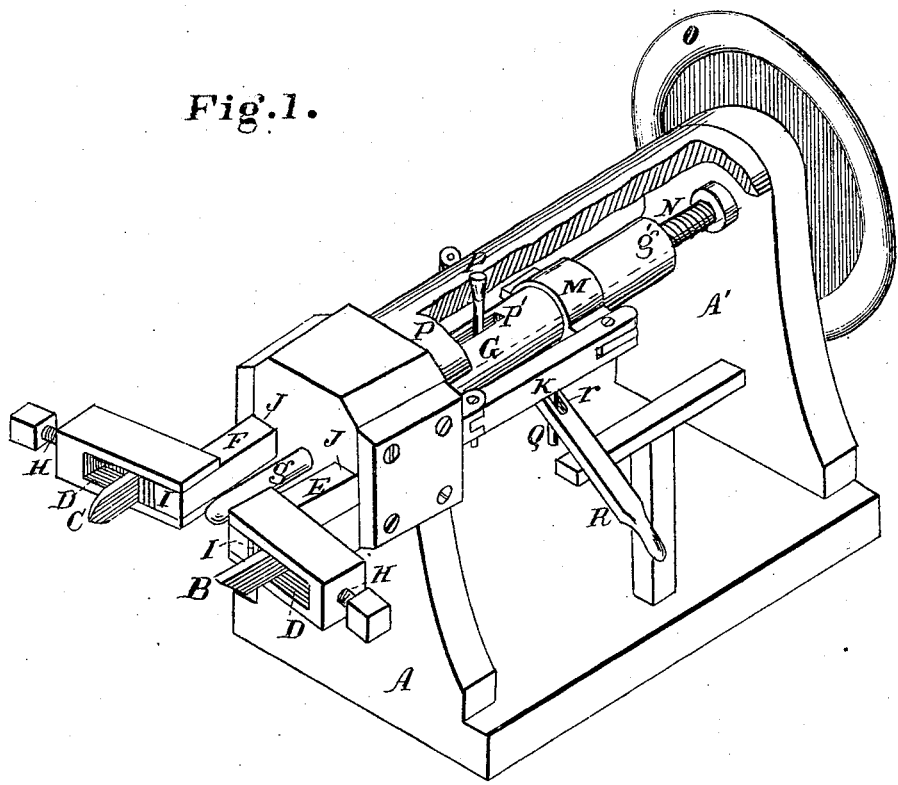
Figure 1 is a perspective view of my invention, a portion being cut away, to show the operation of the spindle by which the blank is held to the clutch-plate, and caused to rotate therewith.
Figure 2:
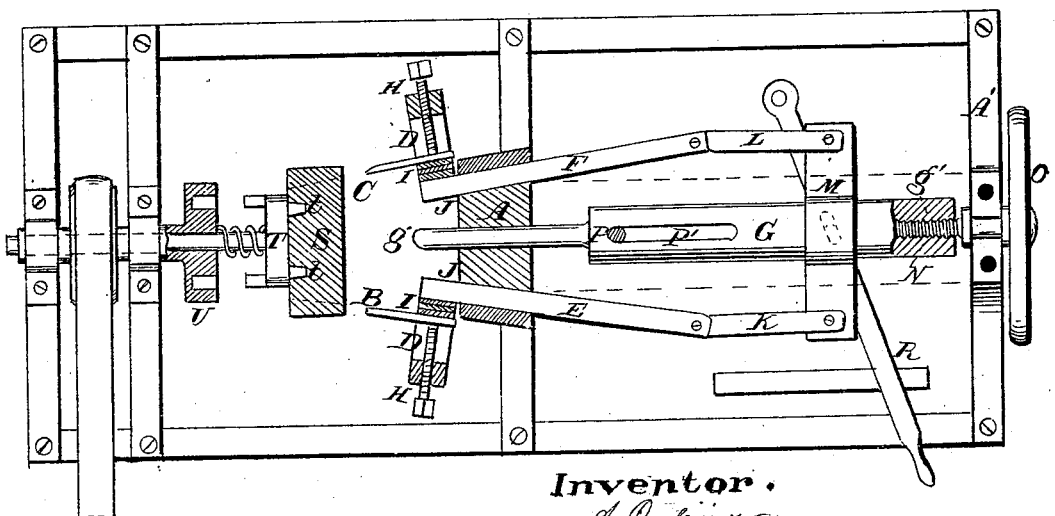
Figure 2 is a plan, portions of which are shown in horizontal section.

A A' is a stock, which is fitted upon ordinary lathe-shears.

B and C are cutters, which are supported in horizontal slots D, in the ends of the sliding bars or tool-holders, E and F.

The cutters have adjustment radially toward or from the holding-spindle G, by means of set-screws H and backing-out blocks I.

The bars E and F slide in horizontal but oblique ways J, made in the forward standard A of the stock, and are connected, by hinges, to links K and L, which are in turn hinged to a sleeve, M, which is made to slide on the enlarged portion of the spindle G.

The forward end, $g$, of the spindle G, slides through the forward standard A, and the said spindle has at the rear end an axial screw-threaded socket, $g'$, to receive the end of its operating tail-screw N, which is journalled in the rear standard A', and is turned by a hand-wheel, O.

The rotation of the spindle G is prevented by a pin, $p$, depending from a curved plate, P, by which the standards A and A' are connected at their upper ends, the said pin $p$ entering a longitudinal slot, $p'$, in the top of the spindle.

Depending from the sleeve M is a pin, Q, which traverses a slot, $r$, in the hand-lever R, by which the sleeve, and with it the cutters, are driven forward.

The operation of my machine is as follows:

A blank, S, of proper thickness, is placed against the driving centre-plate T, when the latter is at rest, and the spindle G is forced forward by the rotation of the tail-screw N.

The rounded end of the spindle is forced against the blank S, and causes, first, its engagement upon the points $t$ of the centre-plate T, and afterward, by forcing said plate toward the turning face-plate U, clutches it therewith, and the blank is rotated.

Upon the rotation of the blank, the cutters B and C are simultaneously moved forward, by means of the lever R and its connections, and a bung is produced, of decreasing diameter toward the driving-centre.

The cutting-edges of the tools are preferably made to differ, in the manner shown in the drawings, one, B, having a chisel-point, and the other one, C, having an incising-point, which acts as a scriber at its extreme end, and, further back, is made to cut a thin shaving from the peripheral face of the bung.

It will be seen that the motions of the cutters are forward and inward, in the direction of the peripheral face of the bung; but this inclination might be reversed, and the bung cut from its smaller instead of its larger end.

It has been an objectionable feature in bung-cutters heretofore, that the parts supporting the cutters could not be made sufficiently firm to prevent vibration in the cutters, and consequent imperfection in the work. This objection is attributable to the practice, heretofore, of placing the cutters upon a turning-head, which necessitated regard to lightness in the construction of the cutter-holding slides or bars, and other parts. Vibration or tremor of the cutter-head was also caused by the looseness of its shaft in the journal-boxes, which could not be obviated even by great care, when the cutter-head was run at the high speed necessary to the perfect finish of the face of the bung.

The above disadvantages are avoided by applying the cutters upon a fixed stock, as before described.

I claim herein as new, and of my invention—

1. The cutters B and C, whose holders, E and F, slide in oblique ways, J, in a fixed stock, as and for the purpose stated.

2. The arrangement of converging cutters B C, sliding and oblique bars E F, oblique ways J J, links K L, sleeve M, and handle R, substantially as and for the purpose set forth.

3. In combination with the parts B C, E F, J J, M, and R, the spindle G $g$ $g'$ $p'$, pin $p$, and tail-screw N, as set forth.

4. In combination with the cutters B C, holders E F, guide J, sleeve M, and handle R, the bung-holding devices T U, substantially as represented.

In testimony of which invention, I hereunto set my hand.

ANDREW GOETZINGER.

Witnesses:
GEO. H. KNIGHT,
JAMES H. LAYMAN.